United States Patent [19]

Hrovat

[11] Patent Number: 5,020,622
[45] Date of Patent: Jun. 4, 1991

[54] MULTIPLE FEEDBACK LOOP CONTROL METHOD AND SYSTEM FOR CONTROLLING WHEEL SLIP

[75] Inventor: Davorin D. Hrovat, Dearborn, Mich.

[73] Assignee: Ford Motor Company, Dearborn, Mich.

[21] Appl. No.: 489,160

[22] Filed: May 6, 1990

Related U.S. Application Data

[62] Division of Ser. No. 233,084, Aug. 17, 1988, Pat. No. 4,936,405.

[51] Int. Cl.$^5$ .............................................. B60K 27/00
[52] U.S. Cl. .................................................... 180/197
[58] Field of Search ............... 180/197, 233, 248, 245; 303/96, 97; 192/0.032, 103 F

[56] References Cited

U.S. PATENT DOCUMENTS

| | | | |
|---|---|---|---|
| 4,487,303 | 12/1984 | Boueri et al. | 192/3.58 |
| 4,554,990 | 11/1985 | Kamiya et al. | 180/197 |
| 4,773,517 | 9/1988 | Watanabe | 180/197 |

FOREIGN PATENT DOCUMENTS 2058819 11/1970 Fed. Rep. of Germany .
2832739 7/1978 Fed. Rep. of Germany .

*Primary Examiner*—Andres Kashnikow
*Assistant Examiner*—Richard Camby
*Attorney, Agent, or Firm*—Allan J. Lippa; Peter Abolins

[57] ABSTRACT

A feedback control system and method for controlling the wheel slip of a wheel driven by torque coupled through an electronically controlled hydraulically operable clutch from an internal combustion engine. A first feedback variable related to wheel slip and a second feedback variable related to hydraulic pressure applied to the clutch are summed to generate a feedback control signal. In response to the feedback control signal, the clutch is slipped by regulating the hydraulic pressure to reduce the driven wheel speed. Engine speed is adjusted in response to a measurement of driven wheel speed to prevent over-revving of the engine and maintain a desired predetermined positive torque on the driven wheel while the clutch is being slipped.

10 Claims, 3 Drawing Sheets

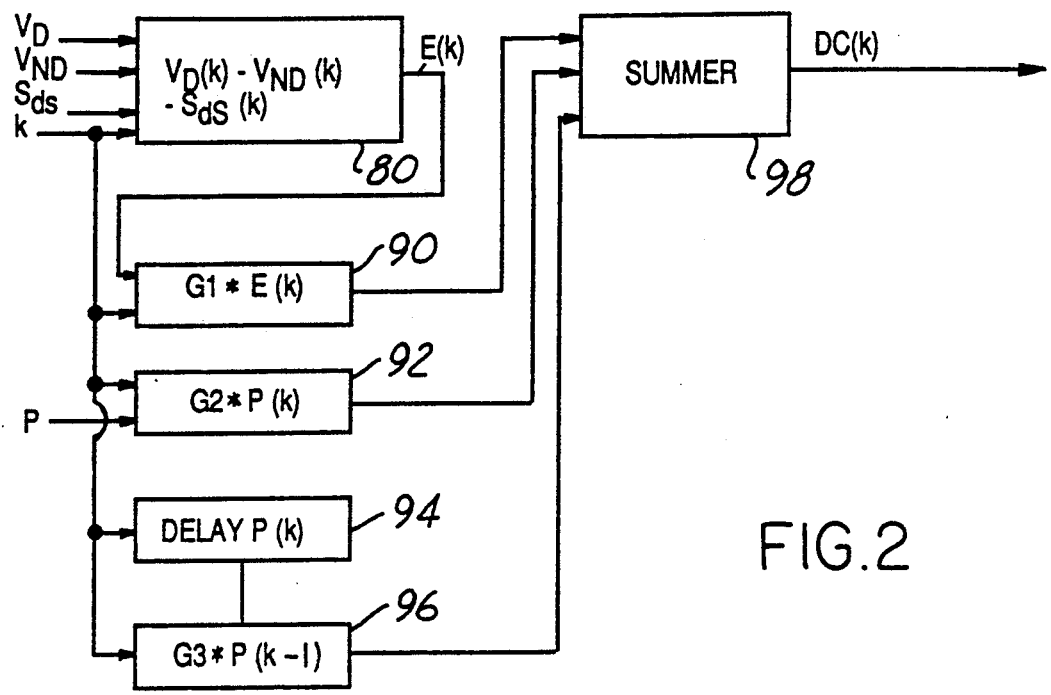
FIG. 2
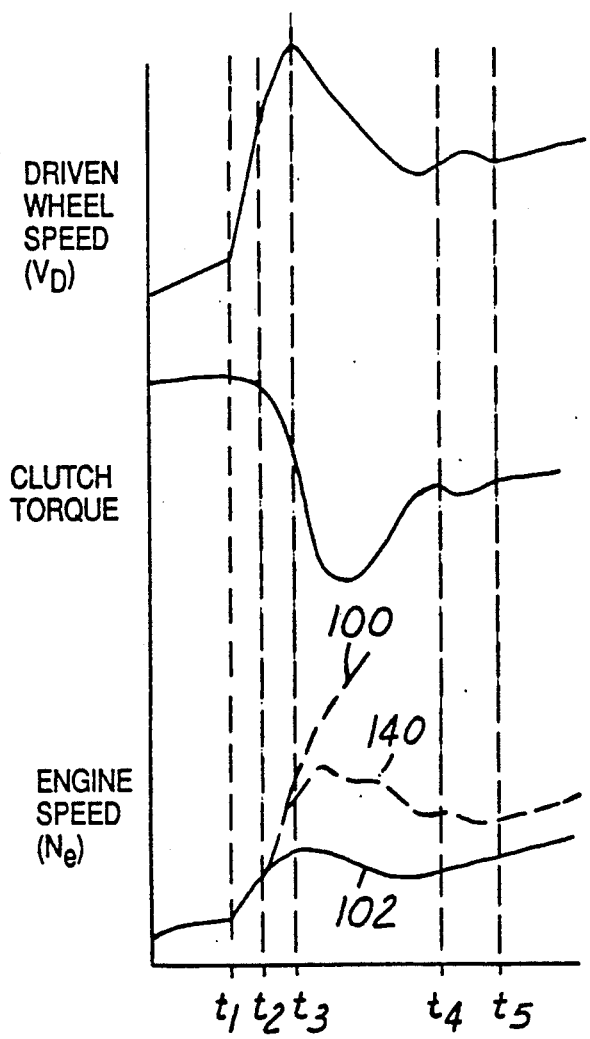
FIG. 4A
FIG. 4B
FIG. 4C

MULTIPLE FEEDBACK LOOP CONTROL METHOD AND SYSTEM FOR CONTROLLING WHEEL SLIP

This is a Division of application Ser. No. 07/233,084, filed Aug. 17, 1988 issued U.S. Pat. No. 4,936,405, 6/26/90.

BACKGROUND OF THE INVENTION

The field of the invention relates to controlling the wheel slip of a driven wheel coupled to an internal combustion engine.

When a vehicle (such as an automobile, truck or motorcycle) accelerates over a slippery surface, the engine torque applied to the driven wheel may cause abrupt acceleration or wheel spin. A temporary loss in vehicle control may result.

An approach towards solving the problem of wheel slip is disclosed in German patents 2058819 and 2832739 wherein the engine throttle is controlled in inverse relation to a measured difference in rotation between a driven wheel and a non-driven wheel. U.S. Pat. No. 4,554,990 issued to Kamiya et al discloses a control system wherein the difference in rotation between a driven wheel and a non-driven wheel is used as a feedback variable. The other feedback variables are a signal related to actual throttle position, and a signal related to throttle position commanded by a vehicle operator.

The inventors herein have recognized numerous disadvantages of these prior approaches. One disadvantage is that torque is removed from the drive wheel by controlling an engine input (throttle). Thus, torque is not removed from the drive wheel until after time delay through the engine is incurred. Another disadvantage is that the feedback variable for engine torque output is derived from wheel speed. This feedback variable is therefore delayed by a time delay through the engine and drivetrain resulting in a feedback loop with poor transient response time.

SUMMARY OF THE INVENTION

An object of the present invention is to provide both a feedback control system and method to control wheel slip with a faster and more stable transient response time than heretofore possible.

The above problems and disadvantages are overcome, and object achieved, by the apparatus and method described herein for controlling the wheel slip of a wheel driven by torque coupled through an electronically controlled hydraulically operable clutch. In one particular aspect of the invention, a method comprises the steps of: generating a first feedback variable related to the wheel slip; generating a second feedback variable related to hydraulic pressure applied to the clutch; summing said first and second feedback variables to generate a feedback control signal; and regulating the hydraulic pressure applied to the clutch in response to the feedback control signal to reduce the wheel slip.

An advantage of the above method is that torque is removed from the driven wheel without incurring the time delay through the engine inherent in prior approaches. A faster response time is thereby achieved than heretofore possible.

In another aspect of the invention, a feedback control method is described for controlling the wheel slip of a wheel driven by torque coupled through an electronically controlled hydraulically operable clutch from an internal combustion engine. More specifically, the feedback control method comprises the steps of: measuring the driven wheel speed; generating a first feedback variable in response to the driven wheel speed which is related to the wheel slip; generating a second feedback variable related to hydraulic pressure applied to the clutch; summing said first and second feedback variables to generate a feedback control signal; slipping the clutch by regulating the hydraulic pressure applied to the clutch in response to the feedback control signal to reduce the driven wheel speed; and adjusting engine speed in response to the measurement of driven wheel speed to prevent over-revving of the engine and maintain a desired predetermined positive torque on the driven wheel while the clutch is being slipped during the regulation step.

An advantage of this particular aspect of the invention is that the engine is prevented from over revving which would otherwise occur when the clutch is slipped in response to a detection of wheel slip. A further advantage is that a desired predetermined positive torque is maintained on the driven wheel while the engine speed is being downwardly adjusted thereby preventing clutch lock-up and associated driveability problems.

In a further aspect of the invention, a feedback control method is described for controlling the wheel slip of a wheel driven by torque coupled through an electronically controlled hydraulically operable clutch from an internal combustion engine having an intake manifold for inducting air therethrough. More specifically, the feedback control method comprises the steps of: measuring driven wheel speed; generating a first feedback variable in response to the measurement of driven wheel speed which is related to the wheel slip; generating a second feedback variable related to hydraulic pressure applied to the clutch; summing the first and second feedback variables to generate a first feedback control signal; slipping the clutch by regulating the hydraulic pressure applied to the clutch in response to the first feedback control signal to reduce the driven wheel speed; generating a third feedback variable indicative of desired engine speed by calculating an engine speed proportional to the measurement of driven wheel speed and adding a preselected speed offset to provide a desired predetermined positive torque on the driven wheel; generating a fourth feedback variable indicative of engine torque output by measuring pressure in the intake manifold; summing the third and fourth feedback variables to generate a second feedback control signal; and adjusting the engine torque output in response to the second feedback control signal.

An advantage of this aspect of the invention is that a feedback variable related to engine torque output is derived from an engine input parameter (manifold pressure) thereby resulting in faster feedback control than heretofore possible. Stated another way, prior approaches relied on a measurement of wheel slip to provide a feedback variable indicative of engine torque output thereby incurring the time delay through the engine, drive train, and wheel. On the other hand, the aspect of the invention described hereinabove utilizes intake manifold pressure as a feedback variable indicative of engine torque output thereby avoiding the time delay indicative of prior approaches. A further advantage is that the engine is prevented from over-revving while the clutch is slipped while maintaining a desired predetermined positive torque on the driven wheel thereby preventing clutch lock-up.

BRIEF DESCRIPTION OF THE DRAWINGS

The objects and advantages described herein will be more fully understood by reading the description of the preferred embodiment with reference to the drawings wherein:

FIG. 2 is an electrical block diagram of a portion of the feedback control systems shown in FIG. 1;

FIG. 4 is a graphical representation of the response time of the feedback control systems described herein.

DESCRIPTION OF THE PREFERRED EMBODIMENT

Figure 1:
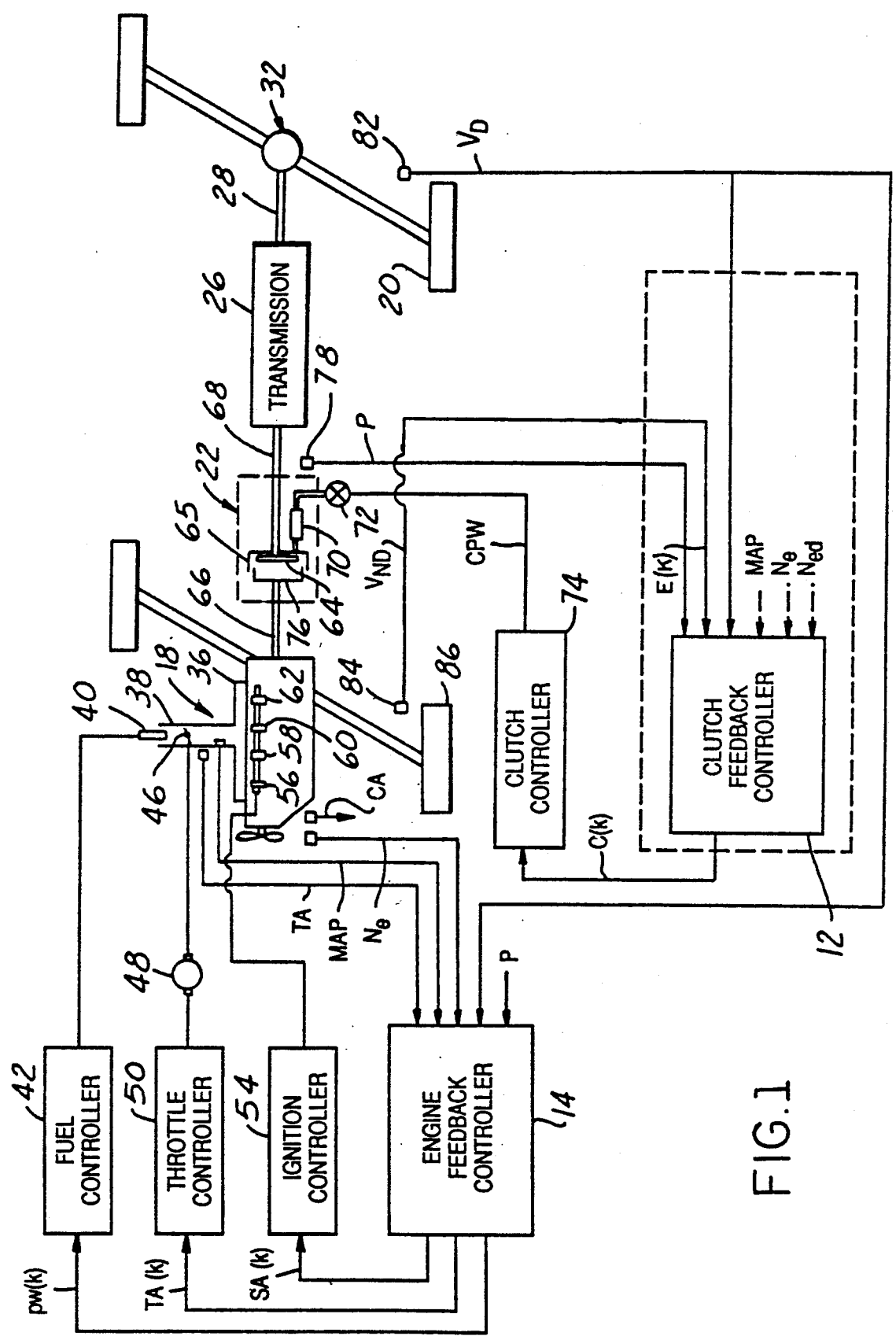
FIG. 1 is a schematic showing a conventional motor vehicle controlled by the feedback control systems described herein.

Referring first to FIG. 1, in general terms which are described in greater detail hereinafter, clutch feedback controller 12 and engine feedback controller 14 are shown as feedback control systems receiving inputs from, and controlling, motor vehicle 16 when detected wheel slip exceeds a desired or preselected value.

Motor vehicle 16 is shown in this particular example having an internal combustion engine 18 coupled to drive wheel 20 via clutch 22, automatic transmission 26, driveshaft 28, and differential/axle 32. As described in greater detail hereinafter, clutch 22 is an electronically controlled, hydraulically actuated clutch coupled directly between engine 18 and transmission 26 without the need for a conventional torque convertor.

Engine 18 is shown in this example including an intake manifold 36 for inducting an air/fuel mixture therein via air/fuel intake 38. Fuel injector 40, shown as a portion of a central fuel injected system in this example, injects fuel into air/fuel intake 38 under control of conventional fuel controller 42. Throttle plate 46 is here shown actuated by servo motor 48 in response to throttle controller 50 for adjusting flow through air/fuel intake 38 in a conventional manner. Conventional ignition controller 54 is shown providing ignition timing and appropriate ignition spark to spark plugs 56, 58, 60, and 62.

It is to be understood that the feedback control systems described herein may be used to advantage with any type of combustion engine such as, for example, carbureted engines, multiport fuel injected engines, and direct fuel injected engines. Further, the feedback control systems are not limited to automobiles, but may be used to advantage with any apparatus having an engine coupled to a drive wheel through a clutch such as, for example, a motorcycle.

Continuing with FIG. 1, clutch 22 is shown including clutch plates 64 coupled to transmission shaft 68, and friction elements 65 operably coupled to engine shaft 66 via clutch housing 76. Hydraulic piston 70 is shown coupled to friction elements 65 for coupling and decoupling clutch plates 64 to friction elements 65 thereby coupling and decoupling engine 18 to transmission 26. Pressurized hydraulic fluid from a transmission pump (not shown) enters hydraulic piston 70 under control of electronically controlled solenoid valve 72. Microprocessor or clutch controller 74 electronically actuates solenoid valve 72 by pulse width modulated signal CPW to control clutch 22. The amount of torque coupled from engine 18 to transmission 26 is controlled by slippage of clutch 22. The slippage of clutch 22 is inversely related to the hydraulic pressure applied by hydraulic piston 70 and therefore inversely related to the pulse width of signal CPW. Pressure transducer 78 provides electronic signal P proportional to the hydraulic pressure applied by hydraulic piston 70. As described in greater detail hereinafter, pressure signal P is a feedback variable to clutch feedback controller 12. Clutch 22 and associated controls are shown and described in more detail in U.S. Pat. No. 4,487,303 issued to Boueri et al and assigned to Ford Motor Company, the specification of which is incorporated herein by reference.

Referring now to FIG. 2, and continuing with FIG. 1, feedback clutch controller 12 is shown schematically as a flow chart of computational and decision making steps represented as blocks. Each block shown herein describes an operation performed by the controller. It is noted that these operations may also be performed by discrete components wherein each block comprises an array of circuits such as, for example, IC adders and IC multipliers.

Wheel slip detector block 80 is shown receiving signal $V_D$ from sensor 82 proportional to the speed of driven wheel 20, and signal $V_{ND}$ from sensor 84 proportional to the speed of non-driven wheel 86. Desired wheel slip signal $S_{ds}$ is also coupled to block 80 from a source (not shown), such as a potentiometer or suitable memory, for preset selection of desired wheel slip by the manufacturer. Signals $V_D$, $V_{ND}$, and $S_{ds}$ are sampled at a sampling instant k and their difference computed to generate error signal E(k) each sample period (T). Error signal E(k), is represented in this example by the following equation:

$$E(k) = V_D(k) - V_{ND}(k) - S_{ds}(k)$$

Error signal E(k) is multiplied by gain constant $G_1$ in block 90 once each sample period to generate feedback variable $G_1*E(k)$ related to wheel slip. It is noted that there are numerous other techniques which may be used to advantage for calculating error signal E(k). For example, the derivative of $V_D$ may be calculated to provide a measurement of abrupt acceleration associated with wheel slip thereby avoiding the need for a non-driven wheel sensor. This scheme may be used to particular advantage with four-wheel drive vehicles. As another example, wheel slip may be determined by comparing the driven wheel speed to actual vehicle speed. A measurement of actual wheel speed may be obtained from a radar unit such as Doppler Radar Unit II, sold by Dickie-John Corporation of Auburn, Ill.

In block 92 pressure signal P is sampled and multiplied once each sample period by gain constant $G_2$ to generate feedback variable $G_2*P(k)$ related to clutch pressure. Sampled pressure signal P(k) is also shown delayed in block 94 and then multiplied by gain constant $G_3$ in block 96 to form feedback variable $G_3*P(k-1)$ which is a higher order feedback variable related to clutch pressure.

The negative of each feedback variable is shown added in summer block 98 to generate feedback control signal $DC(k) = -G_1*E(k) - G_2*P(k) - G_3*P(k-1)$. In response to feedback control signal DC(k), clutch controller 12 proportionally reduces the pulse width of signal CPW applied to solenoid valve 72. Accordingly, clutch 22 is slipped in proportion to the absolute magnitude of feedback control signal DC(k) thereby proportionally reducing torque coupled through clutch 22 and applied against driven wheel 20.

It is noted that feedback control signal DC(k) may include other feedback variables derived from error signal E(k). For example, a derivative of E(k) or an integral of E(k) or a combination of both may be used to advantage.

Operation of clutch feedback controller 12 and its effect on wheel slip and engine speed are shown schematically in FIGS. 4A through 4C. Referring to FIG. 4A, an illustrative example is presented wherein motor vehicle 16 encounters a slippery surface while accelerating. At time $t_1$, driven wheel speed $V_D$ is shown abruptly accelerating as driven wheel 20 begins to slip beyond desired wheel slippage. In response to a detection of the wheel slippage, feedback clutch controller 12 appropriately slips clutch 22 thereby reducing torque coupled therethrough as illustrated at time $t_2$ with reference FIG. 4B. Acceleration of driven wheel 20 (slope of $V_D$ versus time graph shown in FIG. 4A) therefore decreases after time $t_2$. As the torque coupled through clutch 22 to driven wheel 20 falls below the torque applied to it from the road surface, wheel 20 deaccelerates (time $t_3$) thereby reducing the wheel slip. At time $t_4$, driven wheel speed $V_D$ and clutch torque output are shown achieving steady-state operation.

It is noted that through the action of clutch feedback controller 12, torque coupled to driven wheel 20 is reduced without incurring a time delay through engine 12 characteristic of prior approaches. Stated another way, in prior approaches where wheel slip was controlled through the engine throttle, there was an additional delay through the engine before torque output was reduced. Accordingly, an advantage of the invention described herein is that a faster response time is achieved than was possible with those prior approaches.

Continuing with FIGS. 4A-4C, with particular reference to FIG. 4C, it is seen that actual engine speed $N_e$ begins to increase abruptly when clutch 22 is slipped by clutch feedback controller 12. This abrupt increase in engine speed, or over-revving, is a condition referred to as engine flare-up. Without the engine control described hereinafter, engine flare-up would continue along line 100. However, engine feedback controller 14 prevents flare-up and results in engine operation as depicted by line 102.

Figure 3:
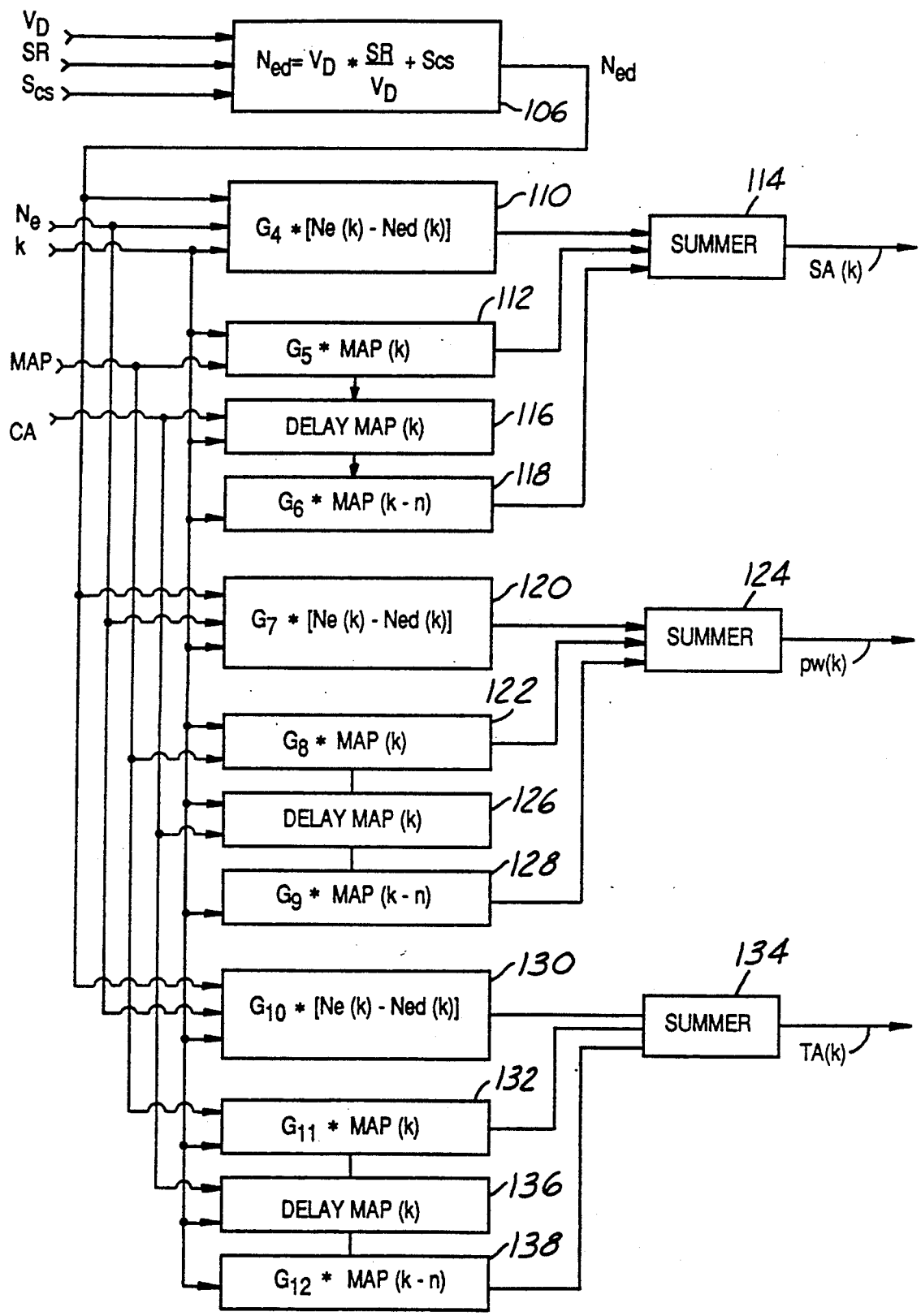
FIG. 3 is an electrical block diagram of a portion of the feedback control systems shown in FIG. 1.

Engine feedback controller 14 is now described with particular reference to the electrical schematic shown in FIG. 3. The blocks shown therein are representative of computational and decision making steps performed by a controller in this example. Those skilled in the art will recognize that these blocks may also represent an array of conventional discrete components such as IC multipliers and IC adders. It will also be recognized that although three feedback control signals are generated for separately controlling engine spark [SA(k)], engine fuel [pw(k)], and engine throttle [TA(k)], the invention may be used to advantage with any one of any combination of these or other control signals controlling engine operation.

Desired engine speed block 106 is shown providing desired engine speed signal $N_{ed}$ in response to: driven wheel speed signal $V_D$; speed ratio signal SR, representative of the gear speed ratio between clutch 22 and driven wheel 20 which depends upon the gear ratios of both transmission 26 and differential/axle 32; and a desired clutch slippage signal $S_{cs}$ for prevention of clutch lock-up during control by feedback clutch controller 12. More specifically $N_{ed} = V_D * SR + S_{cs}$. At the desired engine speed ($N_{ed}$), a desired predetermined torque is coupled from engine 18 to clutch 22 which is positive with respect to torque coupled thereto from driven wheel 20. Accordingly, when engine feedback controller 14 reduces engine speed to prevent flare-up, engine speed is not reduced below $N_{ed}$ by action of feedback engine controller 14. If engine speed were reduced below $N_{ed}$, engine torque applied to clutch 22 may result in clutch lock-up, or sticking, and associated driveability problems.

As shown by block 110, actual engine speed signal $N_e$ and desired engine speed signal $N_{ed}$ are sampled and their difference multiplied by gain constant $G_4$ once each sample period. Feedback variable $G_4*[N_e(k)-N_{ed}(k)]$ is thereby generated for summation in summation block 114 of feedback engine controller 14.

Referring to block 112, intake manifold pressure signal MAP (appropriately biased) is shown sampled and multiplied by gain constant $G_5$ once each sample period to generate feedback variable $G_5*MAP(k)$ for summation in summation block 114. Sampled signal MAP(k) is also delayed in delay block 116 by a predetermined number of sample periods (n) to generate signal MAP(k−n) related to the torque output of engine 18. More specifically, the delay is approximately equal to an integer number of time intervals between the induction stroke and the compression stroke. This time delay is derived from a crank angle signal CA which is related to the crank angle of engine 18. Accordingly, the delayed measurement of absolute manifold pressure, MAP(k−n) is proportional to torque output of engine 18 at the time that torque output is generated. Signal MAP(k−n) is then multiplied once each sample period by gain constant $G_6$, as shown in block 118, to generate feedback variable $G_6*MAP(k-n)$ for summation in summation block 114.

Each feedback variable which has been generated as described hereinabove is then summed in summation block 114 to generate feedback control signal SA(k), as shown by the following equation:

$$SA(k) = -G_4*[N_e(k)-N_{ed}(k)] - G_5*MAP(k) - G_6*MAP(k-n).$$

Referring to blocks 120, 122, 124, 126 and 128, the same input signals ($N_{ed}$, $N_e$, MAP) with different gain constants ($G_7$, $G_8$, and $G_9$) generate feedback control signal pw(k) as shown in the following equation $$pw(k) = -G_7*[N_e(k)-N_{ed}(k)] - G_8*MAP(k) - G_9*MAP(k-n)$$

Similarly, with reference to blocks 130, 132, 134, 136 and 138, input signals $N_{ed}$, $N_e$, MAP and respective gain constants $G_{10}$, $G_{11}$, and $G_{12}$ generate feedback control signal TA(k) as shown in the following equation:

$$TA(k) = -G_{10}[N_e(k)-N_{ed}(k)] - G_{11}*MAP(k) - G_{12}*MAP(k-n).$$

In response to feedback control signal SA(k), engine ignition controller 54 (FIG. 1) retards normal engine spark to reduce the torque output and speed of engine 18. Similarly, fuel controller 42 reduces the fuel supplied by fuel injector 40 thereby reducing engine torque output in response to feedback control signal pw(k). Engine torque output is also controlled by throttle controller 50 in response to feedback control signal TA(k) and appropriate manipulation of throttle plate 46 via servo motor 48.

It is noted that engine feedback controller 14 may be used to advantage with any one, or any combination, of the feedback control variables. In this example, all three feedback control variables [SA(k), TA(k), and pw(k)] are shown for a more robust feedback control system. It is also noted that engine feedback controller 14 may operate to advantage without the MAP(k) and MAP(k−n) feedback variables. However reliance only on feedback variables derived from $N_{ed}(k)$ would result in slower transient response time because control of engine operation in response to variations of input conditions would be detected after a time delay through engine 18. On the other hand, by using feedback variables derived from MAP, an indication of engine torque output is achieved by measuring MAP at the engine input thereby eliminating the time delay through engine 18. Accordingly, feedback control having a faster response time and more stable operation is achieved by using the MAP derived feedback variables. An example of the advantages provided by the MAP derived feedback variables is graphically shown in FIG. 4C with particular reference to lines 140 and 102. It is seen that the transient response time is faster and the stability greater by operation of the feedback control system illustrated by line 102 of FIG. 4C.

It is also noted that more robust feedback control and better interaction between clutch feedback controller 12 and engine feedback controller 14 may be achieved by using engine feedback variables with clutch feedback controller 12 and clutch feedback variables with engine feedback controller 14. For example, referring to the dashed lines shown in FIG. 1, engine feedback variables MAP, $N_e$ and $N_{ed}$ are shown coupled to clutch feedback controller 12, and clutch variable P is shown coupled to engine feedback controller 14. The feedback control signals developed from these variables are defined as follows:

$$DC(k) = G_1 *E(k) + G_2 *P(k) + G_3 *P(k-1) + G_{13} *[N_e(k) - N_{ed}(k)] + G_{14} *MAP(k) + G_{15} *MAP(k-1)$$

$$TA(k) = G_{10} *[N_e(k) - N_{ed}(k)] + G_{11} *MAP(k) + G_{12} *MAP(k-n) + G_{16} *P(k) + G_{17} *P(k-1)$$

The other feedback control variables associated with engine feedback controller 14 [SA(k) and pw(k)] are generated in a similar manner to feedback variable TA(k).

This concludes the description of the preferred embodiment. The reading of it by those skilled in the art will bring to mind many alterations and modifications without departing from the spirit and scope of the invention. Accordingly, it is intended that the scope of the invention be limited only by the following claims.

What is claimed is:

1. A feedback control method for controlling the wheel slip of a wheel driven by torque coupled through an electronically controlled hydraulically operable control method comprising the steps of:

generating a first feedback variable related to the wheel slip;
   generating a second feedback variable related to the wheel slip;
   summing said first and second feedback variables to generate a feedback control signal;
   slipping the clutch by regulating the hydraulic pressure applied to the clutch in response to said feedback control signal to reduce the wheel slip; and
   reducing engine speed to a desired engine speed to prevent over-revving and maintain a desired predetermined positive torque on said driven wheel to prevent clutch lock-up while the clutch is being slipped during said regulation step.

2. The feedback control method recited in claim 1 wherein said first feedback variable is generated by comparing the difference between driven wheel speed and non-driven wheel speed to a threshold value.

3. The feedback control system recited in claim 2 wherein said step of reducing engine speed includes the step of reducing engine throttle.

4. A feedback control method for controlling the wheel slip of a wheel driven by torque coupled through an electronically controlled hydraulically operable clutch from an internal combustion engine, said feedback control method comprising the steps of:

measuring the driven wheel speed;
   generating a first feedback variable in response to said driven wheel speed which is related to the wheel slip;
   generating a second feedback variable related to hydraulic pressure applied to the clutch;
   summing said first and second feedback variables to generate a feedback control signal;
   slipping the clutch by regulating the hydraulic pressure applied to the clutch in response to said feedback control signal to reduce the driven wheel speed; and
   adjusting engine speed in response to said measurement of driven wheel speed to prevent over revving of the engine and maintain a desired predetermined positive torque on said clutch with respect to torque coupled to said clutch from the driven wheel thereby preventing clutch lock up while said clutch is slipped.

5. The feedback control method recited in claim 4 wherein said step of adjusting engine speed is responsive to said measurement of driven wheel speed.

6. The feedback control method recited in claim 4 wherein said step of adjusting engine speed is responsive to a desired engine speed calculation including the steps of multiplying said driven wheel speed times a speed ratio between said clutch and the driven wheel to generate a desired clutch speed and then adding a desired clutch slippage value to said desired clutch speed.

7. A feedback control method for controlling the wheel slip of a wheel driven by torque coupled through an electronically controlled hydraulically operable clutch from an internal combustion engine having an intake manifold for inducting air therethrough, said feedback control method comprising the steps of:

measuring driven wheel speed;
   generating a first feedback variable in response to said measurement of driven wheel speed which is related to the wheel slip;
   generating a second feedback variable related to hydraulic pressure applied to the clutch;

summing said first and second feedback variables to generate a first feedback control signal;

slipping the clutch by regulating the hydraulic pressure applied to the clutch in response to said first feedback control signal to reduce the driven wheel speed;

generating a third feedback variable indicative of desired engine speed by calculating an engine speed proportional to said measurement of driven wheel speed and adding a preselected speed offset to provide a desired predetermined positive torque on said driven wheel;

generating a fourth feedback variable indicative of engine torque output by measuring pressure in the intake manifold;

summing said third and fourth feedback variables to generate a second feedback control signal; and adjusting the engine torque output in response to said second feedback control signal.

8. The feedback control method recited in claim 7 wherein said engine torque adjusting step comprises the step of adjusting the air inducted into said engine.

9. The feedback control method recited in claim 4 further comprising application of ignition spark timing to the engine and wherein said engine torque adjusting step comprises adjusting said ignition spark timing.

10. The feedback control method recited in claim 2 further comprising injecting fuel into the intake manifold and wherein said engine torque adjusting step comprises adjusting said injected fuel.

* * * * *